US011910478B2

(12) United States Patent
Ganu et al.

(10) Patent No.: US 11,910,478 B2
(45) Date of Patent: *Feb. 20, 2024

(54) ADAPTIVE WIRELESS CLIENT STEERING

(71) Applicant: Hewlett Packard Enterprise Development LP, Houston, TX (US)

(72) Inventors: Sachin Ganu, San Jose, CA (US); Bernd Bandemer, Santa Clara, CA (US); Jose Tellado, Santa Clara, CA (US); Gaurav Patwardhan, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/239,770

(22) Filed: Apr. 26, 2021

(65) Prior Publication Data

US 2021/0243588 A1   Aug. 5, 2021

Related U.S. Application Data

(63) Continuation of application No. 16/046,296, filed on Jul. 26, 2018, now Pat. No. 10,999,730.

(51) Int. Cl.
*H04W 8/14* (2009.01)
*H04L 41/16* (2022.01)
*H04W 60/04* (2009.01)
*H04B 17/391* (2015.01)
*G06N 20/00* (2019.01)

(52) U.S. Cl.
CPC .............. *H04W 8/14* (2013.01); *G06N 20/00* (2019.01); *H04B 17/3912* (2015.01); *H04L 41/16* (2013.01); *H04W 60/04* (2013.01)

(58) Field of Classification Search
CPC .............. H04W 48/20; H04W 72/085; H04W 36/00837; H04W 28/08; H04W 60/04; H04W 8/14; H04L 43/16; H04L 41/16; G06N 20/00
See application file for complete search history.

(56) References Cited

U.S. PATENT DOCUMENTS

| | | |
|---|---|---|
| 9,078,198 B2 | 7/2015 | Han et al. |
| 9,723,491 B2 | 8/2017 | Ganu et al. |
| 9,877,245 B2 | 1/2018 | Ponnuswamy |
| 2009/0112608 A1 | 4/2009 | Abu-Hakima et al. |

(Continued)

OTHER PUBLICATIONS

AI-Powered Wi-Fi as a Service Part of a $59.8 billion market by 2025, (Web Page), Retrieved Mar. 9, 2018, pp. 1-46.

(Continued)

*Primary Examiner* — Margaret G Mastrodonato
(74) *Attorney, Agent, or Firm* — Hewlett Packard Enterprise Patent Department (57) ABSTRACT

An example network information aggregator is disclosed. The network information aggregator includes a network interface, a memory, and processing circuitry. The processing circuitry is to receive a machine learning model trained using initialization data from a model creation device. The processing circuitry is also to generate a device steering rule to steer a client device from a first radio to a second radio using the machine learning model. The processing circuitry is also to send a steer command to the first radio.

20 Claims, 7 Drawing Sheets

(56) References Cited

U.S. PATENT DOCUMENTS

| | | | |
|---|---|---|---|
| 2011/0184961 A1* | 7/2011 | Aertebjerg | H04L 12/14 |
| | | | 707/754 |
| 2016/0242040 A1 | 8/2016 | Ganu et al. | |
| 2017/0126477 A1 | 5/2017 | Ponnuswamy | |
| 2017/0238199 A1 | 8/2017 | Ponnuswamy | |
| 2017/0257824 A1 | 9/2017 | Ponnuswamy | |
| 2017/0332292 A1 | 11/2017 | Ponnuswamy | |
| 2019/0058987 A1* | 2/2019 | Raleigh | H04L 12/14 |

OTHER PUBLICATIONS

Rademacher, M., Solarmesh Final Report Client Steering, (Web Page), Aug. 27, 2014, pp. 1-36.

* cited by examiner

FIG. 7

ADAPTIVE WIRELESS CLIENT STEERING

BACKGROUND

Some enterprise wireless networks include many wireless access points (APs) across a campus. Each AP may include multiple radios. For example, certain APs currently being produced include two 5 GHz radios and a 2.4 GHz radio for 802.11 communication with wireless client devices (e.g. laptops, mobile phones, Internet of Things devices, etc.). As a wireless client device interacts with its environment (e.g. moves across the campus), it may be beneficial for the wireless client device to cease communication with a certain radio of the network and begin communication with a certain other radio of the network. In some situations, the wireless network initiates and assists the wireless client device transition between the radios using a process called steering.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

Some wireless networks include multiple wireless radios for transceiving data with wireless client devices, such as laptops, cell phones, Internet of Things devices, etc. One or more of the wireless radios may be contained within an access point (AP). For example, an AP may include two 5 GHz radios and a 2.4 GHz radio. Each client device may, at a certain point in time, be communicatively paired with a certain wireless radio of the wireless network. Some of the client devices paired to wireless radios of the wireless network may more successfully communicate with the wireless network when paired to other wireless radios of the wireless network. Both the client device and the wireless network can initiate a transfer of the client device from one wireless radio to another.

The wireless network may use a process called steering to transfer client devices between radios. In some examples of this disclosure, the wireless network may execute device steering rules that include criteria in order to determine when to steer a client device to a different wireless radio. Certain criteria may include client device characteristics (device type, device model, etc.), client state information (apps running on the client device, types of data being transceived by the device, patterns of data transceived by the device, network services being accessed by the client device, a status of an application executing on the client device, a type of application executing on the client device, a pattern of data use by the client device, types of data being transceived by the client device, an activity pattern of the client device, a power state of a client device, etc.), and radio environment characteristics (interference sources, campus radio coverage characteristics, etc.). The device steering rules may be generated and removed in accordance with a machine learning model. APs may receive specific steer commands (e.g. "steer client device X from radio 1 to radio 2") when the criteria of a certain device steering rule is met. An AP that steers a client device may generate a roaming record that includes the result of the steer, including whether or not the steer was successful. Likewise, a client device may initiate roaming between radios without a steer command being executed by an AP. An AP, in response to the client device initiated roaming may generate a roaming record including information about the client device initiated roaming. The machine learning model may be updated by training the model using information including the roaming record.

Different examples consistent with this disclosure may locate components and features (e.g. the machine learning model, model training data, device steering rules, etc.) in one or more of many places inside and outside of the wireless network, including in the cloud, on another network, on a device in the wireless network, on APs of the wireless network, on network controllers of the wireless network, etc. Although examples of this disclosure may describe a certain feature or component as residing on a network information aggregator or a model creation device, features and components may be located anywhere inside or outside of the wireless network, as appropriate.

Technical Advantages

By incorporating client device characteristics, client state information, and radio environment characteristics into device steering rules, a wireless network improves the quality of device steers and improve the rate of successful steers. By updating the machine learning model with data from the wireless network, the quality and success of device steers are further improved to handle steer conditions that may not have been optimally handled prior to the model update.

Figure 1:
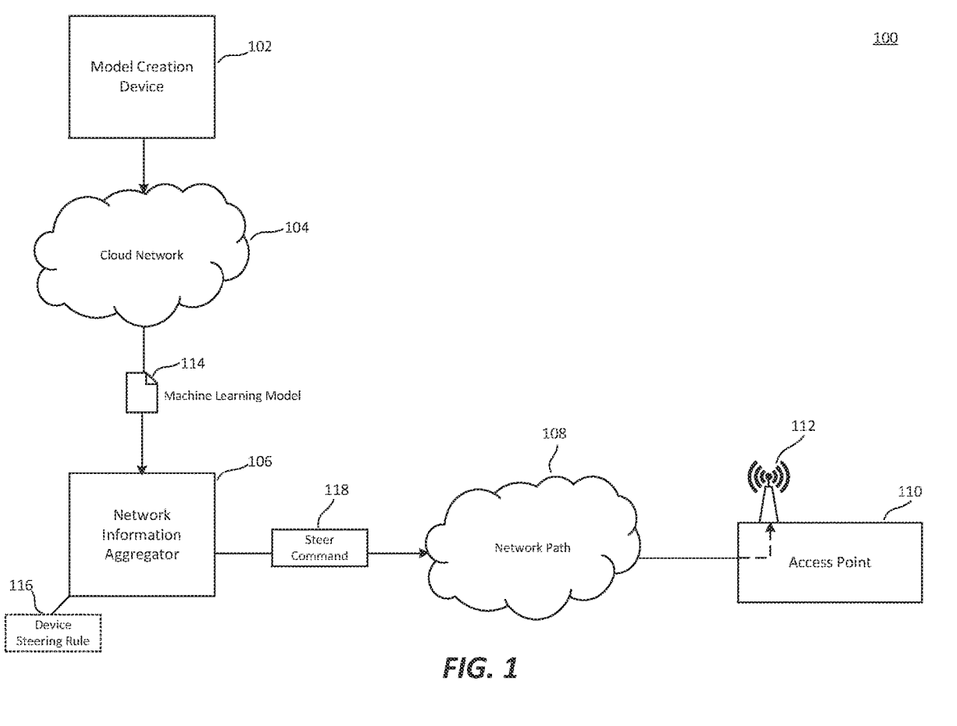
FIG. 1 illustrates an example network information aggregator in an example network.

FIG. 1 illustrates an example network information aggregator in an example network. Network 100 includes network information aggregator 106, network path 108 and access point 110. Network 100 is communicatively coupled to model creation device 102 through cloud network 104. Access point 110 includes radio 112. Network information aggregator 106 receives machine learning model 114 from model creation device 102 through cloud network 104. Network information aggregator 106 generates device steering rule 116 using machine learning model 114. Device steering rule 116 steers a client device from a first radio to a second radio when criteria of device steering rule 116 are met. Network information aggregator 106 sends steer command 118 through network path 108 to access point 110. In some examples, access point 110 applies steer command 118 to radio 112 and moves a client device from radio 112 to another radio. In some examples, the other radio is a component of access point 110. In some other examples, the other radio is a component of another access point.

In some examples, network information aggregator 106 receives radio environment characteristics of radio 112 from access point 110 and sends steer command 118 in response the radio environment characteristics matching radio environment criteria of device steering rule 116. For example, device steering rule 116 may include criteria that the radio environment around radio 112 includes a signal to noise ratio (SNR) below a certain threshold. When all of the criteria of device steering rule 116, including the SNR criterion, are satisfied, network information aggregator 106 generates steer command 118. AP 110 may then steer the client device from radio 112 based on steer command 118.

In certain examples, network information aggregator 106 receives a roaming record from AP 110 that contains results of AP 110 steering the client device based on steering command 118. Network information aggregator 106 may augment the roaming record by including additional information in the roaming record, such as client state information of the client device, radio environment characteristics of radio 112, and other appropriate information. An example roaming record as received from AP 110 may be as follows:

| MAC addr of Originating AP | MAC addr of Destination AP | Status |
|---|---|---|
| 04EE88CDB9C4 | 04EE88CDBA08 | Success |

The example roaming record may be augmented by network information aggregator 106 using information received from AP 110, a network controller (not shown) in network path 108, the client device (not shown), and other sources. For example, the roaming record may be augmented as follows:

| MAC of Orig. AP | MAC of Dest. AP | Client MAC | Client Device Type | Move Reason | SNR at Orig. Radio | SNR at Dst. Radio | Orig. AP Env. ID | Client Device Mobility | Status |
|---|---|---|---|---|---|---|---|---|---|
| 04EE88CDB9C4 | 04EE88CDBA08 | 00112243F1D0 | iPhone | Sticky | −77 dBm | −63 dBm | 15 | Indoor Mobile | Success |

Certain of the additional information may be determined or inferred based on data received at network information aggregator 106. For example, an AP environment ID for AP 110 may be determined based on a local density of APs, the type of AP 110, propagation characteristics, or other relevant radio environment characteristics. A client device mobility characteristic may be determined using link records and probing frames intercepted by AP 110 and other APs. Other characteristics may be transmitted to network information aggregator 106 from AP 110 or other network devices. For example, an SNR of radio 112 of AP 110 may be transmitted to network information aggregator 106.

In some examples, network information aggregator 106 forwards the augmented roaming record to model creation device 102, which may use the augmented roaming record to update machine learning model 114. For example, the updated machine learning model 114 may, based upon the augmented roaming record in combination with other data, conclude that certain client devices should be steered from radio 112 when radio 112 has certain radio environment characteristics.

As previously mentioned, portions of the system may be located in various devices across the network. For example, features of network information aggregator 106 may be located on cloud network 104, such as on model creation device 102. As another example, features of model creation device 102 may be located on the local network, such as on network information aggregator 106. As yet another example, features of model creation device 102 and network information aggregator 106 may be located on a network controller or AP 110. Any other appropriate physical configuration of the features of the disclosed system are contemplated by this disclosure.

Figure 2:
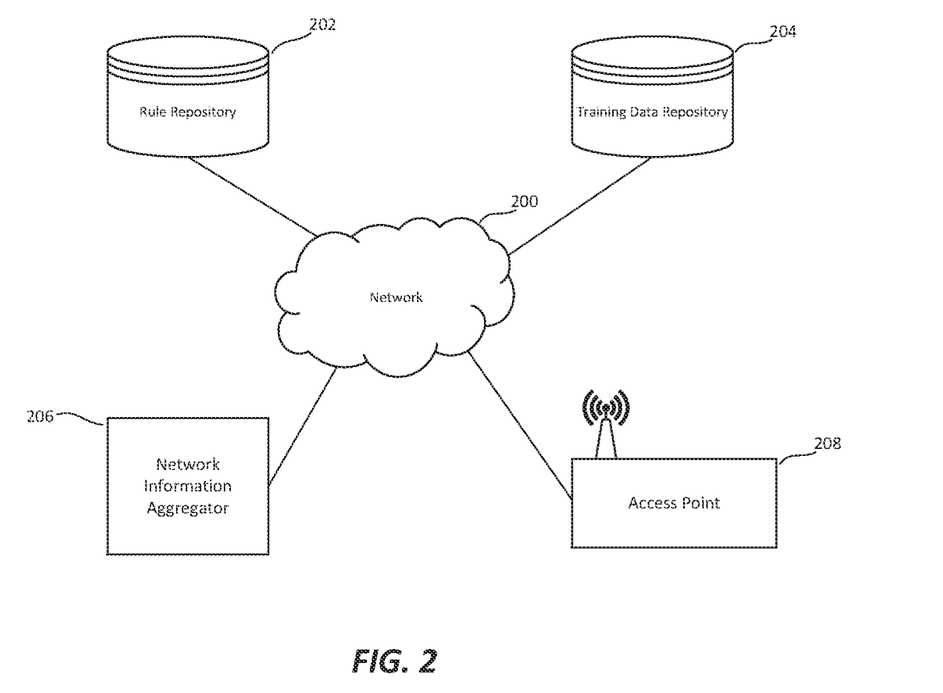
FIG. 2 illustrates an example network including repositories and a network information aggregator.

FIG. 2 illustrates an example network including repositories and a network information aggregator. In some examples, network 200 refers to a combination of Internet (e.g. cloud), wide area network, local area network, and wireless local area network devices, or any combination therein. Network 200 includes rule repository 202, training data repository 204, network information aggregator 206, and access point 208. Training data repository 204 includes data to train a machine learning model for generating device steering rules. In some examples, the data includes roaming records previously collected by network information aggregator 206. In certain examples, the data includes roaming records from networks other than network 200 (e.g. roaming records collected by network information aggregators other than network information aggregator 206). Certain roaming records in training data repository 204 may be collected from information provided by AP 208. For example, a roaming record transmitted from AP 208 to network information aggregator 206, and network information aggregator 206 may augment the roaming record with additional information received from AP 208, including client state information of a relevant client device and radio environment characteristics of a relevant radio.

Training data repository 204 may also include initialization data used to generate a new machine learning model. In some examples, the initialization data may also include roaming records from network 200 and from networks other than network 200. In some examples, initialization data may train a new machine learning model in a way that gives the machine learning model the highest likelihood of success across multiple network environments and specific improvements to the model to better fit network 200 are integrated during subsequent model updates. For example, a "generic" machine learning model may be generated by a device (e.g. a model creation device, network information aggregator 206, etc.) and deployed to network 200 (e.g. transmitted to a device in network 200). A device would then gather additional data from devices on network 200, including AP 208, and update the machine learning model so that the machine learning model is more successful in network 200. In some other examples, initialization data may train a new machine learning model in a way that gives the machine learning model the highest likelihood of success for network 200, specifically, and any subsequent model updates improve the likelihood of success even more for network 200. For example, a machine learning model may be trained using data from networks similar to network 200, including network 200. Data from networks dissimilar to network 200 may be filtered from the training data set. Then, the model would be deployed to network 200 and would have a high likelihood of success in network 200 given the selective training the model received. For example, a model training device may transmit the machine learning model to network information aggregator 206. The model may then be updated using additional data collected from network 200 to improve the likelihood of success. In yet other examples, initialization data may train a new machine learning model in a way that accounts for network differences across a variety of networks, including network 200, and generates a rule appropriate to the relevant network. For example, a machine learning model may be trained and deployed in a multi-tenant scenario, wherein multiple networks, including network 200, use the results of the machine learning model. The model may generate different rules for different networks. In some such examples, training data repository 204, rule repository 202, and the machine learning model may be hosted in the cloud and may be accessible as a service. In yet other examples, training data repository 204 is a component of network information aggregator 206, and the machine learning model is trained by network information aggregator 206. In other examples, a portion of training data repository 204 resides on a first device and includes data not from network 200 and another portion of training data repository 204 resides on a second device (e.g. network information aggregator 206) and includes data from network 200. This disclosure contemplates any combination of components and devices appropriate for training a machine learning model and using the machine learning model to generate device steering rules for use in network 200.

In some examples, the machine learning model trained by data from training data repository 204 generates device steering rules stored in rule repository 202. The device steering rules include triggering criteria. Triggering criteria may include radio environment criteria, which are matched by radio environment characteristics of a target radio (e.g. a radio currently connected to a client device, a radio that is a candidate for connecting to the client device), client state information, which are matched by state information (e.g. apps running on the client device, types of data being transceived by the device, patterns of data transceived by the device, network services being accessed by the client device, etc.) of a client device, and device information (e.g. device type, device model, device mobility characteristics, etc.) of a client device. A device steering rule may include any number (including zero) of each type of criteria. The device steering rules may also include steer command creation instructions. Device steering rule creation instructions may direct network information aggregator 206 what information to include in the steer command generated when the relevant device steering rule is triggered. For example, a device steering rule that steers a client device to a 2.4 GHz radio when out of range of the nearest 5 GHz radios may specify that the destination radio of the steer be a 2.4 GHz radio.

In some examples, network information aggregator 206 sends a request to rule repository 202 and receives a set of rules from rule repository 202 relevant to network 200. In some other examples, network information aggregator 206 compares information received from AP 208 and other devices on network 200 to rules stored on rule repository 202 without receiving the rules from rule repository 202. In yet other examples, rule repository 202 is a component of network information aggregator 206. For example, network information aggregator 206 may receive a machine learning model that has been trained using initialization data (e.g. from training data repository 204) from a model creation device. Network information aggregator 206 may then generate a device steering rule, using the machine learning model, to steer a client device from a radio of AP 208 to another radio when criteria of the device steering rule are met. This disclosure contemplates any configuration of components and devices appropriate for applying rules generated by a machine learning model to network 200 based on information from devices of network 200.

According to a device steering rule, network information aggregator 206 may send a steer command to AP 208, specifically destined for the radio of AP 208 that is currently coupled to a client device to be steered. For example, if an iPhone with a MAC ending in 45FF is communicatively coupled to a first radio of AP 208, and all of the conditions (e.g. radio environment characteristics of the first radio match radio environment criteria of the device steering rule), are satisfied for a device steering rule to steer iPhone 45FF to a second radio of an adjacent AP, network information aggregator 206 generates a steer command and sends the steer command to AP 208. AP 208 then steers iPhone 45FF to the second radio of the adjacent AP. In some examples, network information aggregator 206 sends the steer command to a network controller controlling AP 208 and the network controller steers iPhone 45FF to the second radio of the adjacent AP (which may or may not be controlled by the network controller). In yet other examples, network information aggregator 206, rules repository 202, and training data repository 204 may be components of the network controller, AP 208, other APs of network 200, or a combination therein.

In some examples, AP 208 sends a response to network information aggregator 206 that includes a result of applying the steer command. For example, AP 208 may send a message indicating that iPhone 45FF was steered from the first radio to the second radio successfully. In some examples, the network controller, rather than AP 208, sends the response to network information aggregator 206.

In certain examples, network information aggregator 206 generates a roaming record that includes the result of applying the steer command. The roaming record may also include client state information of the client device and radio environment characteristics of the first radio. In some examples, the response sent to network information aggregator 206 is a roaming record generated by a device of network 200 (e.g. AP 208, network controller, etc). In such examples, network information aggregator 206 augments the roaming record with additional information (e.g. client state information and radio environment characteristics). In some examples that include a model creation device, network information aggregator 206 sends the roaming record to the model creation device and then network information aggregator 206 receives an updated machine learning model trained using data including the roaming record from the model creation device.

Figure 3:
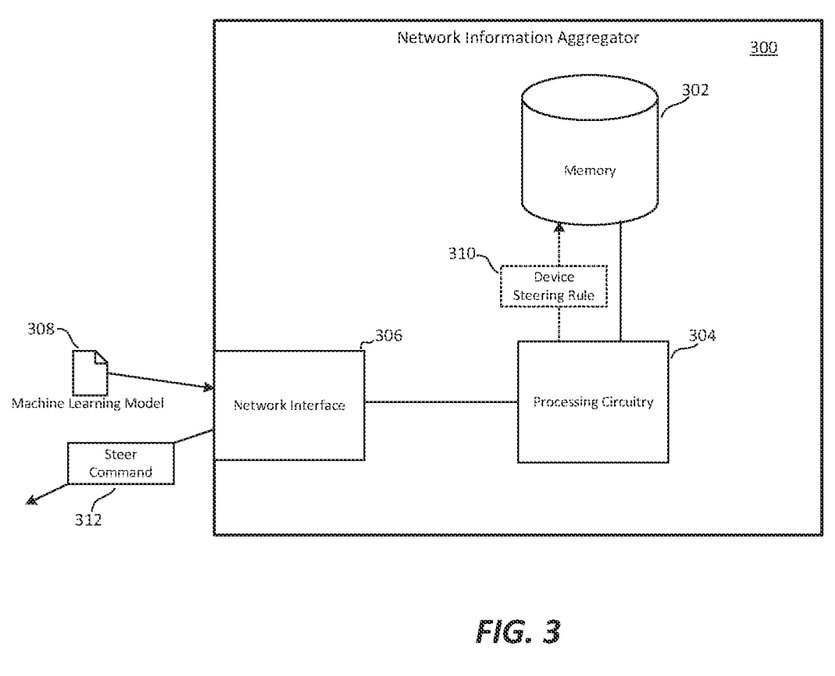
FIG. 3 illustrates an example network information aggregator.

FIG. 3 illustrates an example network information aggregator. Network information aggregator 300 includes memory 302, processing circuitry 304, and network interface 306. Network interface 306 receive machine learning model 308. Using machine learning model 308, processing circuitry 304 generates device steering rule 310 and stores device steering rule 310 in memory 302. When criteria of device steering rule 310 are met, network interface 306 sends steer command 312.

In some examples, memory 302 includes instructions to be executed by processing circuitry 304. In some examples, the instructions may cause processing circuitry 304 to train machine learning model 308 using initialization data stored in a training data repository. The initialization data may include roaming records. In some examples, machine learning model 308 is trained at a separate device (e.g. a model creation device) using initialization data stored in a training date repository at a separate device (e.g. the model creation device, a separate repository device, etc.) In some other examples, machine learning model 308 is trained in processing circuitry 304 using initialization data stored in a training data repository in memory 302.

In certain examples, the instructions may cause processing circuitry 304 to generate, using machine learning model 308, device steering rule 310 including radio environment criteria. In some examples, device steering rule 310 is stored in a rule repository of memory 302.

The instructions, in some examples, may cause processing circuitry 304 to transmit device steering rule 310 to a network device. For example, network information aggregator 300 may send device steering rule 310 through network interface 306 to a network device, such as a network controller, an AP, or another appropriate network device. In certain examples, device steering rule 310 may be transmitted in response to a request from the network device. Alternatively, network information aggregator 300 may retain device steering rule 310 in memory 302 and generate steer command 312 when criteria of device steering rule 310 are met. Network interface 306 may send steer command 312. In some examples, device steering rule 310 includes client state information.

In some examples, machine learning model 308 may be updated using information from the network that network information aggregator 300 is coupled to. The instructions, in such examples, may cause processing circuitry 304 to receive a roaming record from network interface 306. The roaming record may include information about the results of steer command 312 being applied by a network device. The instructions may then cause processing circuitry 304 to update machine learning model 308 by training machine learning model 308 using the roaming record.

Figure 4:
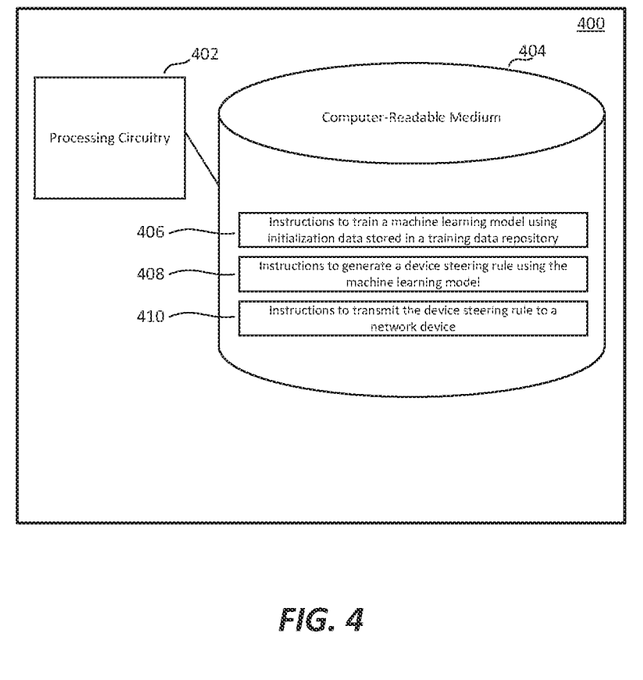
FIG. 4 illustrates an example network information aggregator including a computer-readable medium including instructions.

FIG. 4 illustrates an example network information aggregator including a computer-readable medium including instructions. Device 400 includes processing circuitry 402 and computer-readable medium (CRM) 404. CRM 404 includes instructions 406, 408, and 410.

Instructions 406, when executed on processing circuitry 402, cause device 400 to train a machine learning model using initialization data stored in a training data repository. In some examples, the training data repository is stored in CRM 404. In some other examples, the training data repository is stored in another device communicatively coupled to device 400 through a network (e.g. a local area network, a wide area network, a cloud network).

Instructions 408, when executed on processing circuitry 402, cause device 400 to generate a device steering rule using the machine learning model. In some examples, the device steering rule includes radio environment criteria and client state criteria. In certain examples, the device steering rule is stored in a rule repository.

Instructions 410, when executed on processing circuitry 402, cause device 400 to transmit the device steering rule to a network device. In some examples, device 400 receives a request for the device steering rule and responds by transmitting the device steering rule to another device.

Figure 5:
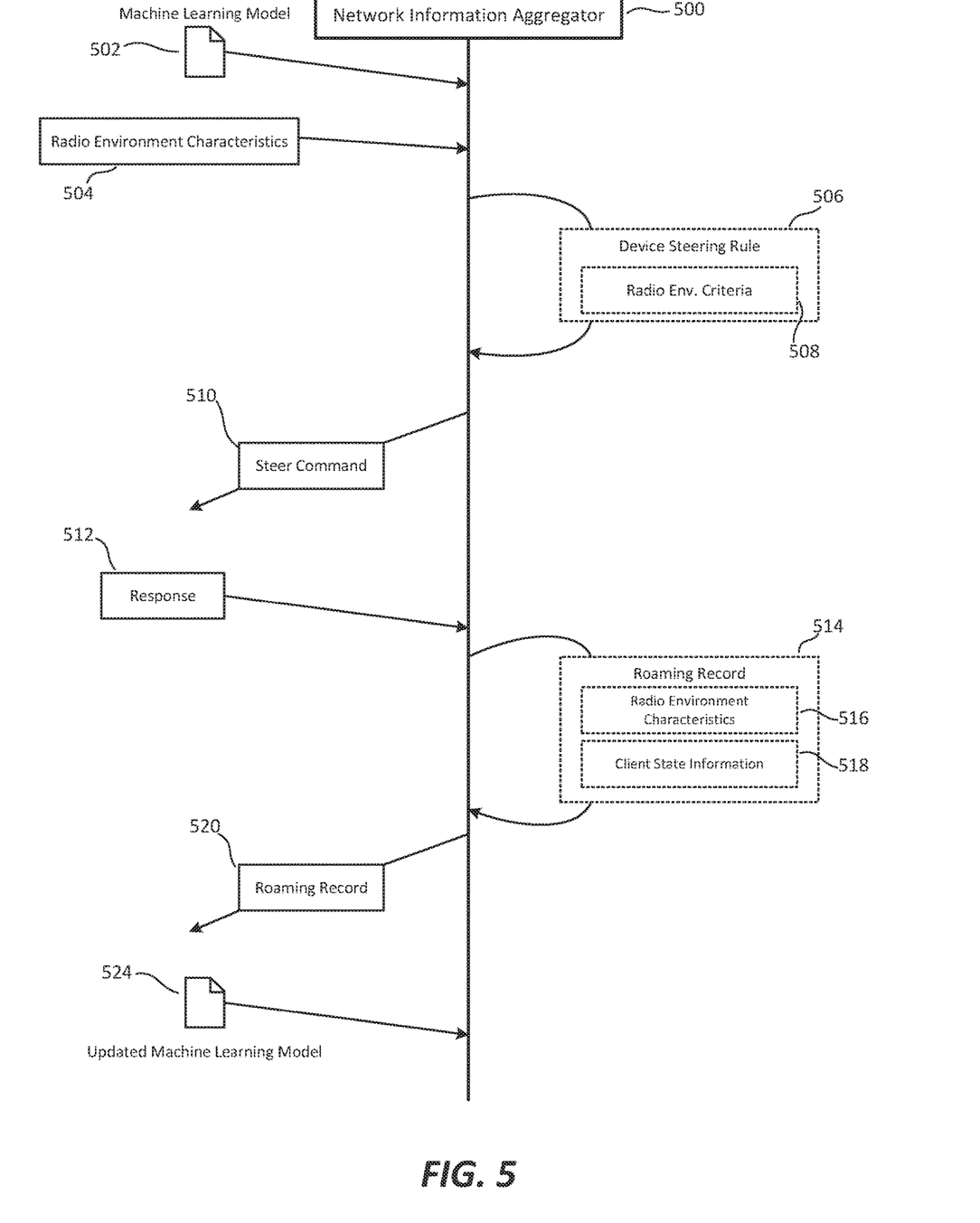
FIG. 5 illustrates an example network information aggregator interacting with an example network.

FIG. 5 illustrates an example network information aggregator interacting with an example network. In FIG. 5, the vertical line represents a timeline of the actions undertaken by network information aggregator 500. Arrows and related features to the left of the vertical line represent communications to and from a network that network information aggregator 500 is coupled to. Arrows to the right of the vertical line represent internal actions taken by network information aggregator 500.

Network information aggregator 500 receives machine learning model 502 and radio environment characteristics 504. Network information aggregator 500 generates device steering rule 506 including radio environment criteria 508. Network information aggregator 500 sends steer command 510.

Network information aggregator 500 receives response 512. Network information aggregator 500 generates roaming record 514 including radio environment characteristics 516 and client state information 518. Network information aggregator 500 transmits roaming record 520. Network information aggregator 500 receives updated machine learning model 524.

In some examples, network information aggregator 500 receives machine learning model 502 from a model creation device that created machine learning model 502 by training the model using initialization data from networks other than the one coupled to network information aggregator 500. In certain examples, the initialization data includes data collected from other network information aggregators. Machine learning model 502 may be specifically trained to have a high likelihood of successfully operating on network information aggregator 500, rather than being generally trained to operate successfully on any network information aggregator.

Network information aggregator 500 may also receive radio environment characteristics 504 from other devices on the network, including APs, network controllers, network monitoring devices, etc. Radio environment characteristics 504 may include, for example, an environment classification (e.g. an environment ID), and a SNR for each radio on the network.

Network information aggregator 500 may generate device steering rule 506 using machine learning model 502 and radio environment characteristics 504. In certain examples, device steering rule 506 may include certain types of criteria, including radio environment criteria 508 and client state criteria (not shown).

Steer command 510 may be generated in response to all necessary criteria of device steering rule 506 being satisfied. For example, steer command 510 may be generated when radio environment criteria 508 are satisfied. Steer command 510 may include specific instructions for a network device, such as an AP, to steer a certain client device from one radio to another. For example, steer command 510 may instruct to steer a client with a truncated MAC of 29:BD from a radio with a truncated MAC of 94:5F to a radio with a truncated MAC of 20:55. In some examples, steer command 510 may be sent directly to an AP or other radio to implement the steering. In some other examples, steer command 510 is sent to a network controller to implement the steering. In yet other examples, device steering rule 506 itself may be sent to an AP, network controller, or other network device, and the determination of whether the criteria of device steering rule 506 are met is made by the device receiving device steering rule 506.

In some examples, network information aggregator 500 receives response 512 from the AP, network controller, or other network device that implemented the steering. The response may include an indication whether or not the steering was successful. In some examples, the response includes a roaming record. In such examples, network information aggregator 500 augments the existing roaming record such that roaming record 514 includes radio environment characteristics 516 and client state information 518.

Network information aggregator 500 may sent the roaming record 520 (which may be the same as roaming record 514) to a model creation device. In some examples, multiple roaming records are retained by network information aggregator 500 and sent to the model creation device as a batch periodically.

Network information aggregator 500 may receive updated machine learning model 524 from the model creation device. In some examples, updated machine learning model 524 may have been trained using roaming record 520. In certain examples, updated machine learning model 524 was trained using roaming records from network information aggregators other than network information aggregator 500.

Figure 6:
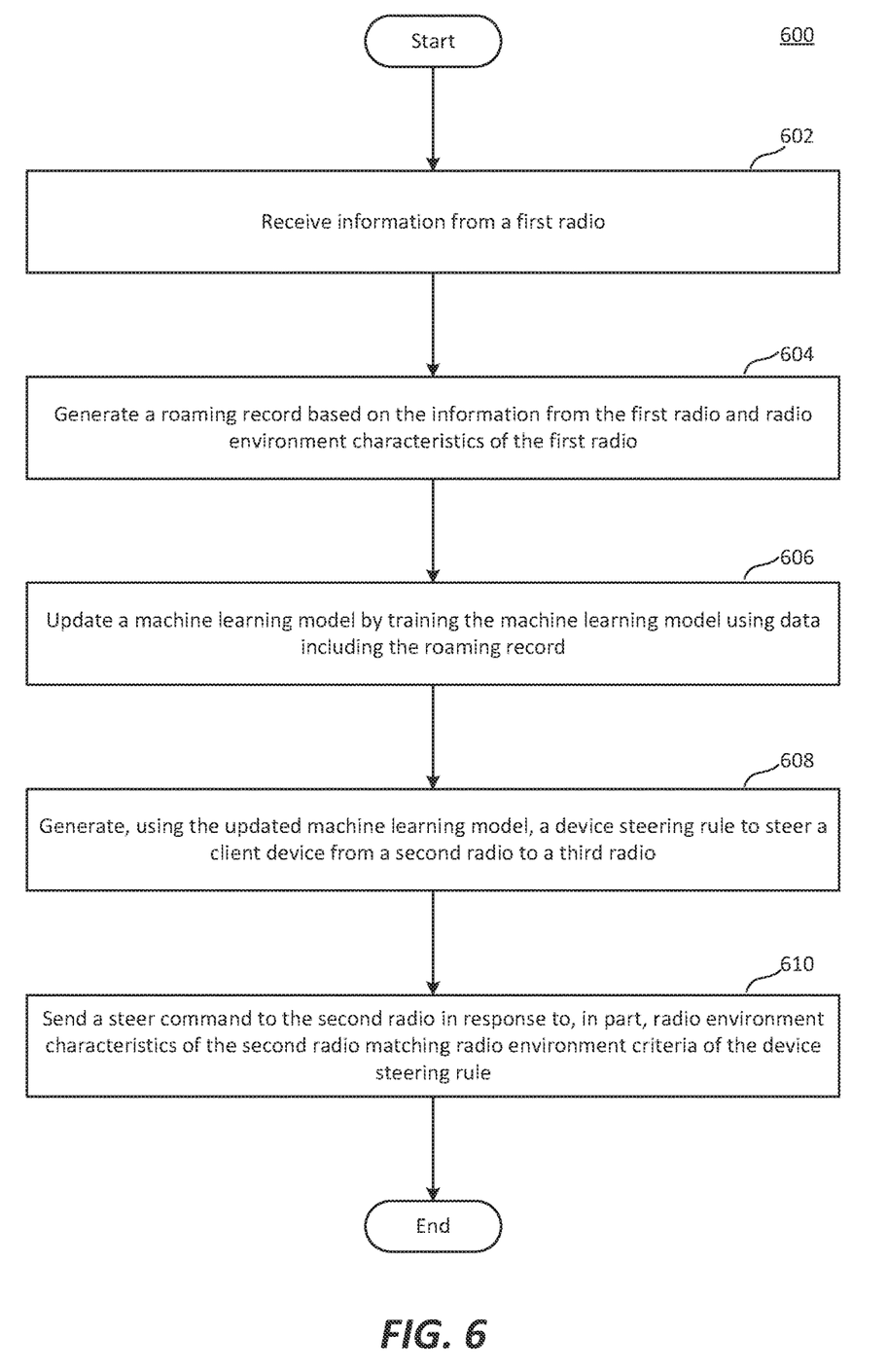
FIG. 6 is a flowchart illustrating an example method for steering a client device.

FIG. 6 is a flowchart illustrating an example method 600 for steering a client device. Block 602 of method 600 receives information from a first radio. In some examples, the information is received at a network information aggregator. The information may include device and state information about a client device paired with first radio. For example, the information may state that a paired client device is an iPhone that has an active data connection with a video streaming service. The information may further include success information about an attempted steer of the client device.

In block 604, a roaming record is generated based on the information from the first radio received in block 602 and radio environment characteristics of the first radio.

In block 606, a machine learning model is updated by training the machine learning model using data including the roaming record. In some examples, the data also includes roaming records from other networks. In certain examples, the data includes multiple roaming records generated by a single network information aggregator, but the multiple roaming records may or may not be generated from information received from the first radio.

In block 608, a device steering rule is generated, using the updated machine learning model, to steer a client device from a second radio to a third radio. The information received from the first radio may be used, in conjunction with other data, to determine criteria of the device steering rule to steer a device from the second radio and to the third radio.

In block 610, a steer command is sent to the second radio in response to, in part, radio environment characteristics of the second radio matching radio environment criteria of the device steering rule. In some examples, the steer command is sent in further response to client state information of the client device matching client state criteria of the device steering rule. In some examples, the steer command is sent in further response to client device information of the client device matching client device criteria of the device steering rule.

Figure 7:
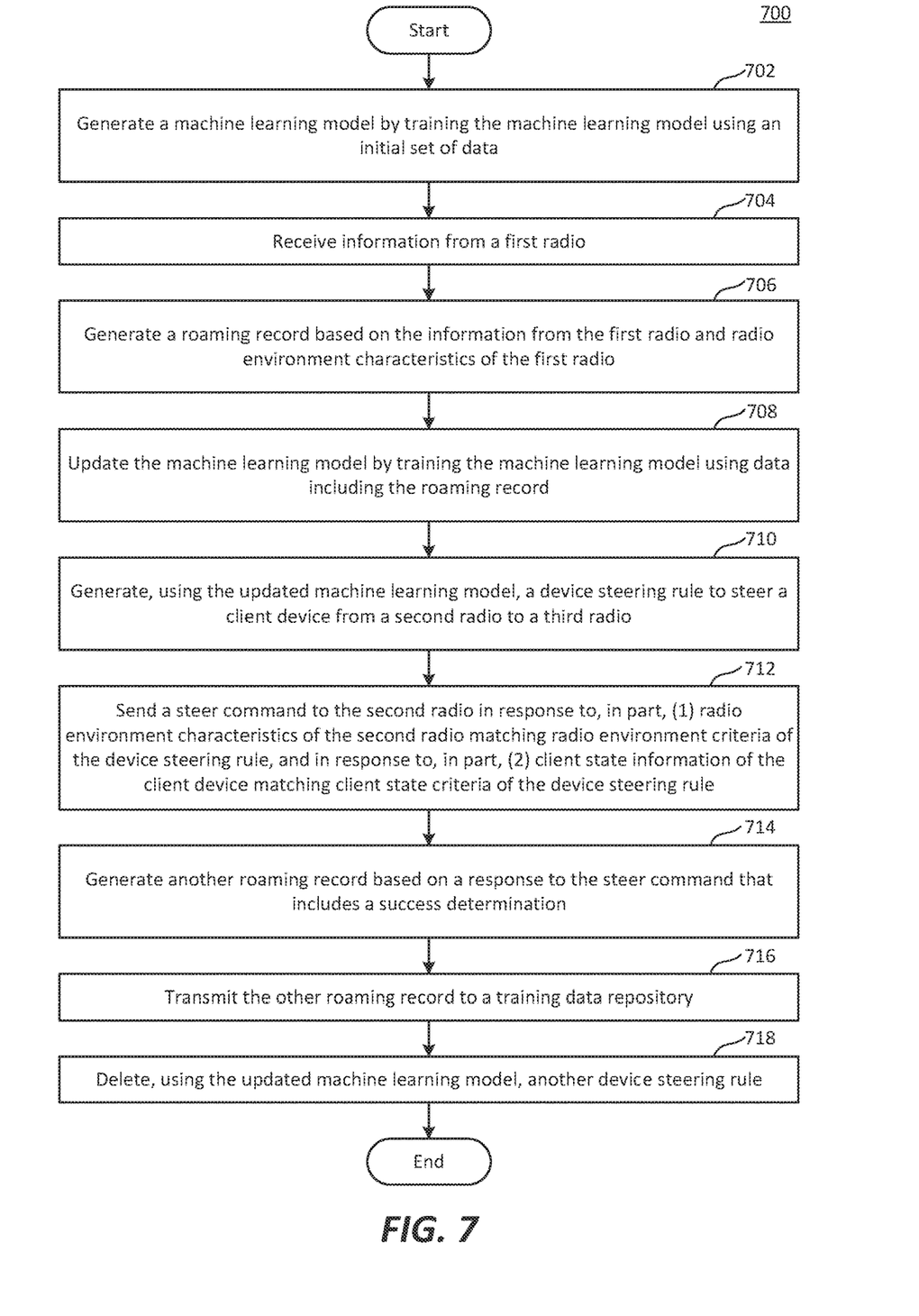
FIG. 7 is a flowchart illustrating another example method for steering a client device.

FIG. 7 is a flowchart illustrating another example method for steering a client device. Method 700 includes blocks 702-718. In some examples, blocks 702-718 are executed on a network information aggregator. In some other examples, blocks 702-718 may be executed on multiple devices, including one or more of a network information aggregator, an AP, a network controller, and a model creation device.

In block 702, a machine learning model is generated by training the machine learning model using an initial set of data. The initial set of data may include roaming records from one or more networks. In some examples, the machine learning model is generated by a model creation device. In some other examples, the machine learning model is generated by a network information aggregator.

In block 704, information is received from a first radio. In some examples, the information is received at a network information aggregator. The information may include device and state information about a client device paired with first radio. For example, the information may state that a paired client device is an iPhone that has an active data connection with a video streaming service. The information may further include success information about an attempted steer of the client device.

In block 706, a roaming record is generated based on the information from the first radio and radio environment characteristics of the first radio.

In block 708, the machine learning model is updated by training the machine learning model using data including the roaming record. In some examples, the data also includes roaming records from other networks. In certain examples, the data includes multiple roaming records generated by a single network information aggregator, but the multiple roaming records may or may not be generated from information received from the first radio.

In block 710, a device steering rule is generated, using the updated machine learning model, to steer a client device from a second radio to a third radio. The information received from the first radio may be used, in conjunction with other data, to determine criteria of the device steering rule to steer a device from the second radio and to the third radio.

In block 712, a steer command is sent to the second radio. The steer command is sent in response to, in part, radio environment characteristics of the second radio matching radio environment criteria of the device steering rule. The steer command is sent further in response to, in part, client state information of the client device matching client state criteria of the device steering rule.

In block 714, a second roaming record is generated based on a response to the steer command that includes a success determination. In some examples, the response is received from an AP that includes the second radio. In some other examples, the response is received from an AP that includes the third radio. In some other examples, the response is received from a network controller.

In block 716, the second roaming record is transmitted to a training data repository. In some examples, the training data repository is located across a network path. In some other examples, the training data repository is stored locally.

In block 718, a second device steering rule is deleted, using the updated machine learning model. In some examples, the updated machine learning model removes the second device steering rule and replaces it with an updated device steering rule. In some other examples, the updated machine learning model removes the second device steering rule because the second device steering rule is no longer useful. In yet other examples the updated machine learning model removes the second device steering rule because the second device steering rule reduces the likelihood of steering success.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network information aggregator of a first network comprising a network interface, a memory, and processing circuitry to:
   train a machine learning model using initialization data stored in a training data repository, the initialization data including roaming information generated by a second network information aggregator of a second network, the roaming information comprising a result of steering a device on the second network;
   generate, using the machine learning model, a device steering rule including radio environment criteria; and
   transmit the device steering rule to a network device.

2. The network information aggregator of claim 1, wherein a steer command is sent to a first radio in response to, in part, radio environment characteristics of the first radio matching radio environment criteria of the device steering rule.

3. The network information aggregator of claim 2, wherein the processing circuitry is also to receive a response to the steer command, including a result of applying the steer command.

4. The network information aggregator of claim 2, wherein the network information aggregator is a component of an access point including the first radio.

5. The network information aggregator of claim 1, the processing circuitry further to:
   receive a roaming record from the network device; and
   update the machine learning model using data including the roaming record from the network device.

6. The network information aggregator of claim 1, wherein the second network is dissimilar to the first network.

7. The network information aggregator of claim 6, wherein generate, using the machine learning model, a device steering rule including radio environment criteria comprises:
   generating different device steering rules for the first network and the second network.

8. The network information aggregator of claim 1, wherein the second network is similar to the first network.

9. The network information aggregator of claim 1, wherein the results of steering a device on the second network comprises whether or not the steering was successful.

10. A method, comprising:
    training a machine learning model using initialization data stored in a training data repository, the initialization data including roaming information generated by a second network information aggregator of a second network, the roaming information comprising a result of steering a device on the second network;
    generating, by a network information aggregator of a first network using the machine learning model, a device steering rule including radio environment criteria; and
    transmitting, by the network information aggregator, the device steering rule to a network device.

11. The method of claim 10, wherein a steer command is sent to a first radio in response to, in part, radio environment characteristics of the first radio matching radio environment criteria of the device steering rule.

12. The method of claim 11, further comprising: receiving a response to the steer command, including a result of applying the steer command.

13. The method of claim 11, wherein the network information aggregator is a component of an access point including the first radio.

14. The method of claim 10, further comprising:
    receiving a roaming record from the network device; and
    updating the machine learning model using data including the roaming record from the network device.

15. The method of claim 10, wherein the results of steering a device on the second network comprises whether or not the steering was successful.

16. A non-transitory, computer-readable medium comprising instructions that, when executed by processing circuitry, cause the processing circuitry to:
    train a machine learning model using initialization data stored in a training data repository, the initialization data including roaming information generated by a second network information aggregator of a second network, the roaming information comprising a result of steering a device on the second network;
    generate, using the machine learning model, a device steering rule for a first network, the device steering rule including radio environment criteria; and
    transmit the device steering rule to a network device on the first network.

17. The computer readable medium of claim 16, wherein a steer command is sent to a first radio in response to, in part, radio environment characteristics of the first radio matching radio environment criteria of the device steering rule.

18. The computer readable medium of claim 17, wherein the processing circuitry is also to receive a response to the steer command, including a result of applying the steer command.

19. The computer readable medium of claim 17, wherein the network information aggregator is a component of an access point including the first radio.

20. The computer readable medium of claim 16, the processing circuitry further to:
    receive a roaming record from the network device; and
    update the machine learning model using data including the roaming record from the network device.

* * * * *